April 1, 1969  G. J. JOHNSON  3,435,557
SELF-CLOSING GATE
Filed Dec. 18, 1967

INVENTOR.
GLENN J. JOHNSON
BY
Schroeder, Siegfried
& Ryan
ATTORNEYS

United States Patent Office 3,435,557
Patented Apr. 1, 1969

3,435,557
SELF-CLOSING GATE
Glenn J. Johnson, Rte. 2, Powell, Wyo. 82435
Filed Dec. 18, 1967, Ser. No. 691,350
Int. Cl. E06b 7/00; E05f 1/04; E05d 7/06
U.S. Cl. 49—70                    14 Claims

ABSTRACT OF THE DISCLOSURE

This invention relates to an electrified self-closing gate. It incorporates a gate frame which is insulated from a support shaft mounting the same so that the gate may be electrified independent of the support. The gate is extensible in that the metal gate frame has tubular arms in which are positioned non-metallic lightweight rods which are slidably mounted therein to varying positions to adjust gate width for any gate opening. The gate is electrified only when it is being swung. Suitable biasing springs connected to the gate frame compensate for windage and insure that the gate frame will ride on a cam through a cam follower attached to the gate frame, the cam being horseshoe shaped and inclined to elevate the gate upon opening and allow the same to be closed through the force of gravity. A depression in the cam provides a reference position or lock position for the gate. The electrified gate is powered from a conventional fencer which is operated by a switch. The switch is controlled by a lever which deflects the switch to operate the same whenever the gate frame is moved upwardly on opening.

---

This invention relates to self-closing gates and more particularly to an electrified self-closing gate particularly adaptable for use on farms and ranches in connection with roadways to permit vehicle passage and to prevent passage of livestock therethrough.

Self-closing gates are known and in use. The prior constructions have taken a variety of forms including spring-biased gates, gravity-operated gates and single direction of opening types. The latter have been particularly used in connection with animals to restrict areas to humans. Still other gates of this type have employed locks or latches which require manual operation for release prior to opening.

The improved self-closing gate of the present invention, which is of the electrified type, is particularly adapted to be used to restrict roadways in ranches and agricultural areas where it is desired to have vehicle passage without requiring the operator to get out of the vehicle to open the gate and yet be a part of an electrified enclosure to prevent egress of live stock therethrough. The improved electrified self-closing gate will be engaged by the vehicle as it passes through to open the gate and will provide no damage or scratching to the vehicle or to the gate through such operation. It is extremely lightweight but will remain closed against wind pressure and will restrict cattle or live stock to prevent their opening of the same. It employs a gravity-type closure through the use of an inclined cam which elevates the gate and has a latch or lock position for alignment such that the gate will always close to the same position and can be used with a similar gate structure across an enclosure for alignment purposes to provide a complete gate. The gate employs a gate frame with tubular arm extensions in which are positioned lightweight nonmetallic rods to provide for the general extent of the gate and these may be adjusted in length for any desired gate opening. In addition, it permits the mounting of electrical conductors or provides a conductive surface to completely electrify the gate and incorporates a power supply for a conventional fencer which will be operated only at a time when the gate is being opened. The improved self-closing gate includes a switch which will be operated as the gate is elevated to energize the conductors at this time. Thus, it will present no continuous drain on the power supply, but will be effective as a portion of an electric fence to restrain live stock.

Therefore, it is the principal object of this invention to provide an electrified self-closing gate.

Another object of this invention is to provide an improved self-closing gate particularly adapted for use across roadways such that they may be engaged by vehicles for opening and yet prevent opening of the same by live stock.

A still further object of this invention is to provide an improved self-closing gate which is extremely lightweight, may be readily operated by humans or opened by vehicles but will be not damaged by such operation.

These and other objects of this invention will become apparent from a reading of the attached description together with the drawings wherein.

Figure 1:
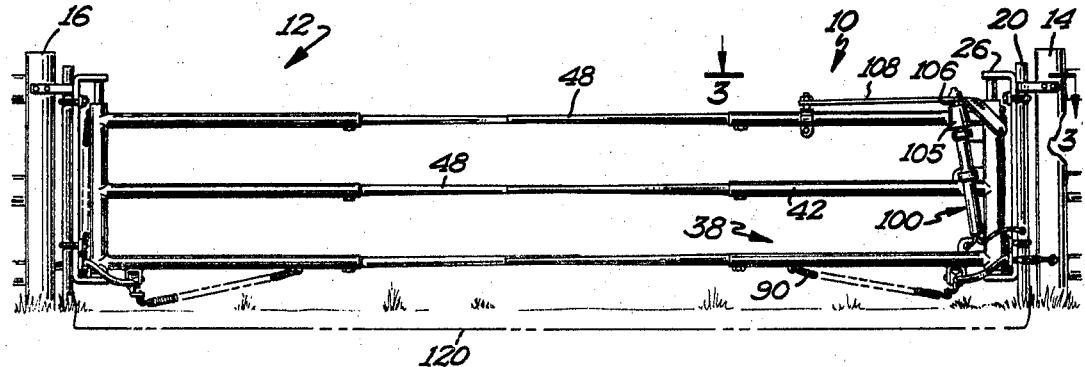
FIGURE 1 is an elevation view of a complete self-closing gate incorporating the present invention.

The electrified self-closing gate of the present invention is shown schematically in FIGURE 1 in connection with an electrified enclosure with the gate being shown in two identical sections 10 and 12 attached to fence or gate posts 14, 16 to which conventional electric fencing would be attached to complete an electrified enclosure for live stock. The gate sections would normally be placed across a road or passageway for the purpose of permitting vehicle traffic or humans to pass through the gate but prevent live stock from passing such a barrier. The improved self-closing gate is adjustable in length to span any desired width of opening between fence posts or gate posts such as 14 and 16 and therefore may be used across variable-sized roadways, as will be hereinafter seen. The improved self-closing gate permits passage of vehicles without requiring the vehicle operator to stop and open the gate. Thus, the improved self-closing gate which is extremely lightweight will permit the passage of a vehicle by direct contact therewith without damage to the gate or the vehicle. Similarly, the human walking may open the gate by grasping a nonelectrified section and swinging it open to permit passage therethrough or shutting off the electric power supply. The improved self-closing gate will be energized when it is opened but will not be energized in the rest or closed position thereby eliminating a drain on the power supply which powers the same.

Figure 2:
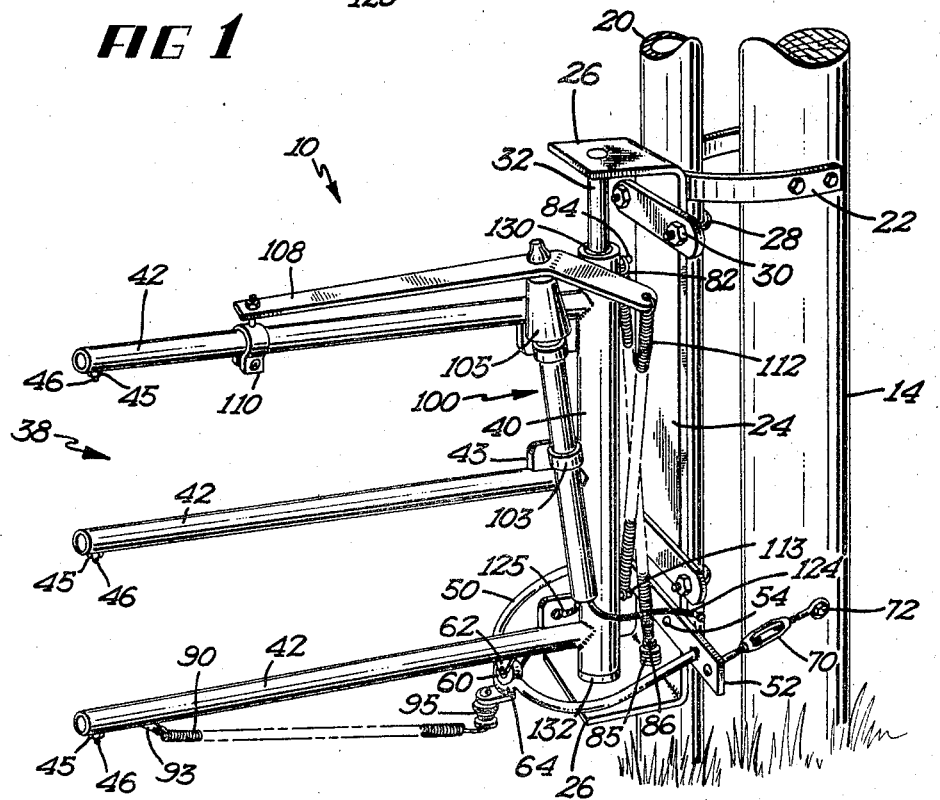
FIGURE 2 is a perspective view of a portion of the electrified self-closing gate showing the relationship of parts.
Figure 3:
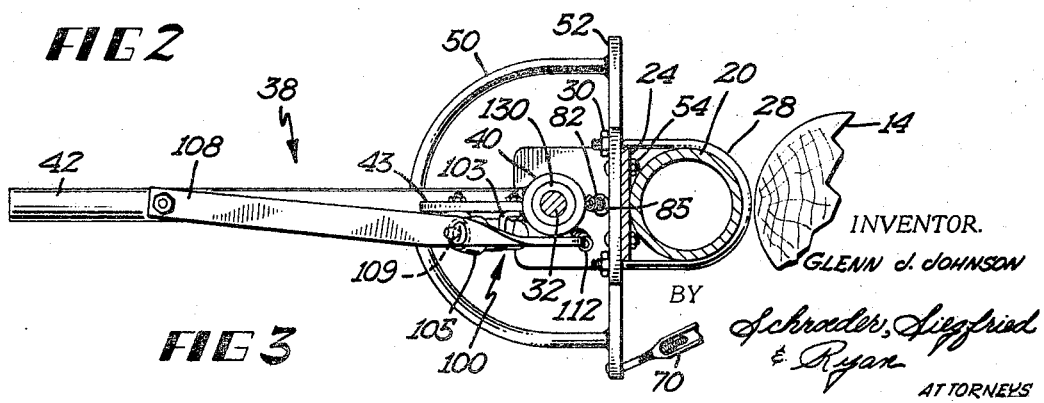
FIGURE 3 is a sectional view of the self-closing gate of FIGURE 1 taken along the lines 3—3 therein.

In FIGURES 2 and 3, a single section is disclosed, and it will be understood that the single section may be used by itself or in conjunction with another section, such as is indicated in FIGURE 1, to provide a self-closing gate particularly adapted for use in agricultural and ranch-type areas. The improved self-closing gate is normally attached to a gate or fence post 14 and includes a steel post 20 which is driven into the ground beside the fence post and is attached to the fence post by means of suitable brackets 22 which are bolted to the fence post. The steel post 20 mounts a support bracket 24 which is generally U or C shaped in form having an elongated extent and bent flanges 26 at the extremities of the same disposed normal to the extent of the support bracket and the post to which the support bracket is attached. Suitable U bolts 28 and nuts 30 may secure the support bracket to the pipe. The support bracket 24 mounts a support shaft 32 which is attached at its extremities to the flanges 26 and suitably secured thereon to be disposed generally parallel to the extent of the support bracket 24 and spaced therefrom. Support shaft 32 mounts a gate frame indicated generally at 38 which is comprised of a back tubular section 40 and a plurality of tubular arm sections 42 connected thereto or formed integral therewith and extending transversely of the back section 40. The back tubular section 40 is mounted on the support shaft 32 and is journaled thereon for rotative movement as well as sliding or axial movement. The support shaft 32 is of longer extent than the back section to permit the gate frame to rise or move axially along the extent of the support shaft as well as rotate thereon. Although only three transversely extending arm sections 42 are shown, it will be understood that these may vary in number and will normally be uniformly spaced apart and connected to the tubular back section by means such as welding. Individual bracing brackets 43 welded between the back section and the tubular arms strengthen the connection therebetween. The transversely extending arm sections 42 extend over a partial width of the entire gate with the remaining width being formed by rods 48 of a lightweight and normally nonmetallic material, such as fiber glass, which rods are mounted in the ends of the tubular arms and secured therein. The rods will fit in a telescopic fashion and may be adjusted in exposed length to vary the width of the gate. Suitable nuts 45 and set screws 46 positioned over apertures in the ends of the arms 42 secure the normally nonmetallic extension rods in the tubular arm sections 42. The nuts 45 are normally welded to the tubular arm sections to permit the set screws to be threaded into an aperture in the tubular arm section and bear against the rod to secure the same therein. The rods 48 will normally be lightweight and of such length to provide the complete form of the enclosure. The tubular arm sections together with the tubular back section 40 will normally be made of a lightweight metal to provide a light gate structure.

Gate frame 38 with the rod extensions 48 therein will rotate on the support shaft 32 and is of the self-closing type. The gate frame will be guided in movement in a rotating and elevating direction through co-operation with a U shaped or horseshoe shaped track or cam member 50 which is generally rod-like in form and is attached at its extremities to a transversely extending plate 52 secured to the support bracket 24 through suitable bolts such as is indicated in 54. The ends of the cam 50 are attached to the transversely extending plate 52 through any suitable means such as welding. The cam member 50 is shaped and positioned to be generally semicircular in form with the bifurcated extremities extending to the plate 52. The semicircular portion will be concentric with the axis of the support shaft 32 and the back frame 40 such that it will provide a track surface for a cam roller or follower 60 in the form of a roller member to ride thereon. The roller is attached by a suitable support bracket 62 which forms the axis of the same to one of the lower transversely extending arm sections 42, as shown in the drawings, and spaced from the back section a distance comparable with the radius of curvature of the cam 50. The cam 50 is also mounted with its bifurcated extremities being positioned adjacent the lower portion of the support shaft with the gate frame thereon and extending downwardly so as to provide the lowest point in the middle of the cam member and on an imaginary line which would extend through the center of curvature of the cam and midway between the bifurcated extremities. The cam member 50 has a depression or recess 64 at this point to provide a lock or point of resistance to movement between the cam follower or roller 60 on the cam member 50. This will be the rest point of the gate and the entire structure may be aligned by shifting the position of the support bracket 24 and the plate 52 for the cam member through attachment of a turnbuckle 70 connected between one extremity of the plate 52 and the gate post 14, such as is indicated at 72. This will enable the gate to be aligned directly across a desired opening and between fence posts so that the gate will close and normally rest in a plane of alignment with the gate posts in a conventional manner.

The gate frame 38 through the co-operation of the roller or cam follower 60 on the cam member 50 will rotate in either direction from the rest position and as the gate is moved from the rest position the cam follower 60 will ride up on the cam surface raising the gate frame on the support shaft. When released the gate will return to the rest position through the influence of gravity. A suitable biasing spring 82 connected to the top extremity of the back section 40 at a flange 84 thereon and extending to the support bracket 24 near the bottom on the same will urge the gate frame and hence the roller into engagement with the cam member to aid in the closure and will adjust for the weight of the gate. A suitable insulator 85 connected to the lower end of the support bracket has a hook 86 thereon provides the mounting for the other extremity of the spring 82 to properly bias the gate frame. Thus, the gate may be opened in either direction, and the gate frame will elevate on the support shaft returning to the rest position where the roller 60 is in the depression 64 of the cam member 50 with each operation automatically. A wind spring 90 attached to the lower of the transversely extending arm sections 42 at a hook or bracket 93 thereon and to the cam member 50 through an insulator 95 attached thereto provides a bias on the gate frame to return it to the rest position. This spring will normally apply a light force sufficient to compensate for any force of the wind against the gate frame to insure that it will remain in the rest position.

The gate frame is electrified by means of a power supply indicated generally at 100 as a tube which is mounted on the gate frame through any suitable means such as brackets 103. This is a conventional fencer and its details are omitted for simplicity. The upper extremity of the fencer tube or power supply mounts a switch indicated generally in block at 105 having a switch button at the upper extremity of the same (not shown) which is contacted by lever arm 108 mounted on the upper of the transversely extending arm sections 42. An insulated cap on the switch button 106 projects through an aperture 109 in lever 108 to position the lever in operating contact with the switch button. As will be seen in FIGURES 2 and 3, one end of the lever 108 is attached to the arm section through a suitable bracket 110 and the lever extends across the top of the switch button 106 with a portion extending beyond the switch 105. This portion is connected to a spring 112 which is attached at its other extremity to the support bracket 24 by an insulator 113. Whenever the gate is elevated by opening, the switch lever which is biased to the support bracket 24 at one extremity will apply force to the switch button cap 106 deflecting the button to operate the switch and energize an electrical circuit electrifying the gate from the power supply 100. The power supply or fencer 100 may be mounted on one of the gate frames and a suitable underground insulated connecting wire, such as is indicated in phantom at 120, in FIGURE 1, may extend between the fence posts and connected to the gate frames to electrify two sections of the gate frames, such as at 10 and 12, for a completely electrified gate closure. One end of the fencer is grounded through the pipe 20 in a conventional manner by a conductor 124 and the other extremity leads from the switch through conductor 125 a bolt connection and on the gate frame. The gate frame 38 itself is insulated from the support shaft 32 through nylon or suitable insulating bearings 130 positioned between the support shaft and the extremities 130 and 132 positioned between the support shaft and the ends of the tubular back section 40 of the gate frame to journal the same thereon and insulate the gate frame from the support shaft 32 and hence the support bracket and post 20. The insulators 85, 95 and 113 provide an insulated connection between the ends of the springs 90 and 82 connected to the gate frame, the switch lever and the support bracket to insulate the gate frame at these points. Electrical conductors may be placed on the fiber glass rods 48 and connected to the metal frame in a conventional manner or the fiber glass rods may be painted with a good metallic paint to provide a circuit in this manner.

Whenever the gate is swung, the gate frame will elevate and the bias spring 112 will apply a force to the end of the lever 108 deflecting the switch to electrify the gate. In this manner the fencer will be energized only whenever the gate starts to open and will remain energized whenever the gate is opened. Thus, when live stock brush against the gate and start to open the same, the gate will be electrified. The gate, because of its lightweight, will not mar or damage the finish or surface of the vehicle passing therethrough and the insulating tires on the vehicle will eliminate the possibility of a circuit therethrough so that even though the gate is electrified, the charge will not affect the occupants of the vehicle inasmuch as no circuit will be completed through the ground. In this manner, no continuous power drain will be placed on the fencer power supply so that it will have a long life and require a minimum of maintenance.

I have found that my improved self-closing gate may be used effectively as a drive-through gate to complete an enclosure without electrification. The improved self-closing gate, which is extremely lightweight, is adjustable to cover any width opening and the additional bias springs with the lock detent or recess in the cam insures that the gate may be effectively closed to the same position and will remain closed despite the force of winds blowing against the same. Similarly, such a gate, while not as effective as the electrified version from the standpoint of retaining livestock, will complete an enclosure of the nonelectrified type which will defer passage of live stock therethrough.

The improved self-closing gate may therefore complete an electrified or nonelectrified enclosure for live stock in agricultural and ranching areas permitting passage of vehicles therethrough without requiring the operator to get down and open the gate or unlock the same. Where the gate is electrified, it is necessary that the fencer be turned off to permit manual passage through the gate and this may be readily accomplished by operating a switch on the fencer unit (not shown). The improved gate is extremely lightweight such as to permit passage of vehicles by engaging the same at a slow speed without damage to the gate. It will at the same time provide a completion of an enclosure to restrain live stock from passage therethrough.

What is claimed is:
1. An electrified self-closing gate comprising,
 (a) an elongated support bracket with transversely extending flanges at the extremities of the same to define a generally C-shaped support adapted to be secured to a gate post in a vertical position with the flanges extending normal thereto,
 (b) a support shaft connected to the flanges of the support bracket and extending therebetween being parallel to the general extent of the support bracket and spaced therefrom,
 (c) a metallic gate frame including a tubular back section and a plurality of spaced transversely extending arm sections formed integral therewith,
 (d) means mounting said gate frame on the support shaft at the back section and journaling said gate frame for rotative movement and sliding movement along the extent of the shaft,
 (e) a plate attached to the support bracket near one extremity of the same,
 (f) a U-shaped cam member attached at its extremities to said plate and encircling said shaft and the back section of said gate frame, said cam member having a curvature which is concentric with the support shaft and the back section of the gate frame mounted thereon, said cam member projecting downwardly from said plate when said support bracket is mounted in a vertical position and having a low point located in a plane bisecting the extent of the cam member and passing through the geometric center of the shaft and the tubular back section of the gate frame,
 (g) a notch positioned in the cam member at said low point,
 (h) a journaled cam follower connected to the gate frame and mounted to ride on the surface of the cam member raising the gate frame on the support shaft as the cam follower moves from said low point on the cam member to either side of the same, said notch in said low point of said cam member forming a lock to hold the gate frame relative to the support bracket in a rest position,
 (i) spring bias means connected between the gate frame and the support bracket and applying a spring bias to hold the cam follower on the gate frame into engagement with the cam member attached to said plate on the support bracket, and
 (j) means including an electric power supply positioned on the gate frame and adapted to electrify the same.

2. The electrified self-closing gate of claim 1 in which the means mounting the gate frame on the support shaft is made of an electrical insulating material to electrically insulate the gate frame from the support shaft and support bracket.

3. The electrified self-closing gate of claim 1 and including a plurality of nonmetallic arms of lightweight material telescopically fitting into the tubular arm sections of the gate frame to varying extents and secured therein to complete a gate section.

4. The electrified self-closing gate of claim 2 in which the nonmetallic arms are made of a fiber glass material and including connecting means positoined in each of said transversely extending arm sections of the gate frame to adjustably secure the fiber glass rods therein.

5. The electrified self-closing gate of claim 1 and including additional spring means connected between said cam member and one of said transversely extending arm sections of the gate frame to provide a spring bias therebetween to prevent the gate frame from swinging from the rest position due to the force caused by wind on the same.

6. The electrified self-closing gate of claim 4 and including means positioned in the elongated support bracket and adapted to connect the support bracket and hence the self-closing gate to a gate post and adjust the position of the gate frame relative to the gate post.

7. The electrified self-closing gate of claim 2 and including insulator means positioned between the ends of said spring bias means to insulate said gate frame from said support bracket.

8. The electrified self-closing gate of claim 2 in which the suppost brackets with shafts thereon and gate frames are two in number being adapted to be positioned on spaced gate posts with said metallic gate frames extending toward one another.

9. The electrified self-closing gate of claim 1 in which the power supply is mounted on the gate frame and is connected to the gate frame and grounded on the support bracket.

10. The electrified self-closing gate of claim 4 and including means on the nonmetallic arms to provide a conductive surface connected to the gate frame.

11. The electrified self-closing gate of claim 9 and including switch means connected between the power source and the electrical conductors to control energization of the same, said switch means being positioned on the gate frame and being operated to electrify the gate when it is moved from a rest position.

12. The electrified self-closing gate of claim 11 in which the switch means includes a switch mounted on the gate frame adjacent the back section and a switch lever pivotally attached at one extremity to a transversely extending arm section and having the other extremity positioned beyond said back section of the gate frame and in contact with the switch on the gate frame with said extremity of said lever being connected by a spring to the support bracket so that the switch means is operated as the gate is raised on the support shaft as it is swung from the rest positon.

13. A self-closing gate comprising,
  (a) an elongated support bracket with transversely extending flanges at the extremitites of the same to define a generally C-shaped support adapted to be sesured to a gate post in a vertical position with the flanges extending normal thereto,
  (b) a support shaft connected to the flanges of the support bracket and extending therebetween being parallel to the general extent of the support bracket and spaced therefrom,
  (c) a metallic gate frame including a tubular back section and a plurality of spaced transversely extending arm sections formed integral therewith,
  (d) means mounting said gate frame on the support shaft at the back section and journaling said gate frame for rotative movement and sliding movement along the extent of the shaft,
  (e) a plate attached to the support bracket near one extremity of the same,
  (f) a U-shaped cam member attached at its extremities to said plate and encircling said shaft and the back section of said gate frame, said cam member having a curvature which is concentric with the support shaft and the back section of the gate frame mounted thereon, said cam member projecting downwardly from said plate when said support bracket is mounted in a vertical position and having a low point located in a plane bisecting the extent of the cam member and passing through the geometric center of the shaft and the tubular back section of the gate frame,
  (g) a notch positioned in the cam member at said low point,
  (h) a journaled cam follower connected to the gate frame and mounted to ride on the surface of the cam member raising the gate frame on the support shaft as the cam follower moves from said low point on the cam member to either side of the same, said notch in said low point of said cam member forming a lock to hold the gate frame relative to the support bracket in a rest position, and
  (i) spring bias means connected between the gate frame and the support bracket and applying a spring bias to hold the cam follower on the gate frame into engagement with the cam member attached to said plate on the support bracket.

14. The self-closing gate of claim 13 in which the plurality of spaced extending arm sections are tubular in form with securing means therein and including a plurality of rods fitted telescopically into the tubular arm sections and secured therein by the securing means to make a gate section having an adjustable width coverage.

References Cited

UNITED STATES PATENTS

| | | | |
|---|---|---|---|
| 1,362,634 | 12/1920 | Markel | 16—154 |
| 2,585,481 | 2/1952 | Martin | 49—237 X |
| 2,628,441 | 2/1953 | Enghauser | 49—237 |
| 2,693,043 | 11/1954 | Leake | 49—237 |
| 2,724,142 | 11/1955 | McNabb | 49—386 X |
| 2,731,744 | 1/1956 | Schnell | 49—59 |
| 3,222,806 | 12/1965 | Martin | 49—237 |
| 3,264,786 | 8/1966 | Nettles | 49—70 |
| 3,293,800 | 12/1966 | Martinmaas | 49—386 X |

FOREIGN PATENTS

| | | |
|---|---|---|
| 925,683 | 5/1963 | Great Britain. |

DAVID J. WILLIAMOWSKY, *Primary Examiner.*

D. L. TAYLOR, *Assistant Examiner.*

U.S. Cl. X.R.

16—154; 49—236